United States Patent
Battaglia

(10) Patent No.: US 10,041,245 B2
(45) Date of Patent: Aug. 7, 2018

(54) ACOUSTIC SLEEPER

(71) Applicant: STC Architectural Products, LLC, Buffalo, NY (US)

(72) Inventor: Paul L. Battaglia, Amherst, NY (US)

(73) Assignee: STC Architectural Products, LLC, Buffalo, NY (US)

( * ) Notice: Subject to any disclaimer, the term of this patent is extended or adjusted under 35 U.S.C. 154(b) by 0 days.

(21) Appl. No.: 15/219,398

(22) Filed: Jul. 26, 2016

(65) Prior Publication Data

US 2018/0030722 A1 Feb. 1, 2018

(51) Int. Cl.

| E04F 15/22 | (2006.01) |
|---|---|
| E04B 1/84 | (2006.01) |
| E04F 15/20 | (2006.01) |
| G10K 11/162 | (2006.01) |
| E04B 5/02 | (2006.01) |
| E04B 5/16 | (2006.01) |

(52) U.S. Cl.
CPC .............. *E04B 1/84* (2013.01); *E04F 15/203* (2013.01); *G10K 11/162* (2013.01); *E04B 5/02* (2013.01); *E04B 5/16* (2013.01)

(58) Field of Classification Search
CPC ...... E04B 1/84; E04B 5/16; E04B 5/02; E04F 15/203; G10K 11/162
USPC ....................................... 52/403.1, 376, 391
See application file for complete search history.

(56) References Cited

U.S. PATENT DOCUMENTS

| 2,862,255 | A | * | 12/1958 | Nelson | .................. | E04F 15/225 |
| | | | | | | 52/403.1 |
| 3,107,377 | A | * | 10/1963 | Nathan | ................. | E01D 19/041 |
| | | | | | | 14/73.1 |
| 3,191,896 | A | * | 6/1965 | Nathan | ................... | F16F 1/377 |
| | | | | | | 16/DIG. 36 |
| RE26,239 | E | * | 7/1967 | Rockabrand | ............ | E04F 15/22 |
| | | | | | | 267/153 |
| 4,002,315 | A | * | 1/1977 | Van Goubergen | ...... | F16F 3/093 |
| | | | | | | 248/633 |

(Continued)

FOREIGN PATENT DOCUMENTS

WO    WO2005113921    12/2005

OTHER PUBLICATIONS

Anonymous, "InstaCoustic The Sound Solution", Instacoustic Ltd., Apr. 2016, 4 pages.

(Continued)

*Primary Examiner* — Basil S Katcheves
(74) *Attorney, Agent, or Firm* — Walt W. Duft

(57) ABSTRACT

An acoustic sleeper for sound suppression in a floor assembly may be formed as a solid sleeper body made entirely from a resilient acoustic isolating material. The sleeper body has a thickness, a width, a length, a generally rectangular cross-section and first and second sides. The sleeper body first side includes a first side area and a first sleeper load-bearing surface for contacting a first floor assembly structure, the first sleeper load-bearing surface having a first load-bearing surface area equal to or less than the first side area. The sleeper body second side has a pair of solid sleeper feet extending therefrom. The sleeper feet collectively provide a second sleeper load-bearing surface for contacting a second floor assembly structure. The second sleeper load-bearing surface has a second load-bearing surface area that is less than the first side area by at least a factor of three.

20 Claims, 4 Drawing Sheets

(56) References Cited

U.S. PATENT DOCUMENTS

| | | | |
|---|---|---|---|
| 4,759,164 A | 7/1988 | Abendroth et al. | |
| 4,856,250 A | 8/1989 | Gronau et al. | |
| 5,377,471 A * | 1/1995 | Niese | E04F 15/22 52/376 |
| 5,388,380 A * | 2/1995 | Niese | E04F 15/22 52/403.1 |
| 5,433,052 A * | 7/1995 | Niese | E04F 15/04 52/403.1 |
| 5,682,724 A * | 11/1997 | Randjelovic | E04F 15/225 52/403.1 |
| 5,906,082 A | 5/1999 | Counihan | |
| 6,044,606 A * | 4/2000 | Hamar | E04F 15/225 52/391 |
| RE37,615 E * | 4/2002 | Niese | E04F 15/22 52/393 |
| 6,367,217 B1 * | 4/2002 | Niese | E04F 15/225 52/403.1 |
| 6,718,715 B2 * | 4/2004 | Elliott | E04F 15/225 52/403.1 |
| 2002/0180834 A1 | 8/2002 | Elliott | |
| 2005/0193670 A1 | 9/2005 | Niese et al. | |

OTHER PUBLICATIONS

Anonymous, "Acoustic Deep Batten (B60T)", Incoustic Co. Ltd., Apr. 2016, 2 pages.
Anonymous, "Acoustic floor batten system", Custom Audio Designs Ltd, Aug. 2010, 3 pages.
Anonymous, "Acoustic Floor Treatment—Deep Batten Floor", Custom Audio Designs Ltd, Apr. 2016, 1 page.
Anonymous, "Shallow and Deep—Acoustic Resilient Composite Floor Battens", Custom Audio Designs Ltd. Apr. 2016, 5 pages.
Anonymous, "Acoustic Floor Solutions for Refurbishment and New Build", Proctor Group Ltd, Mar. 2016, 24 pages.
Anonymous, "Installation Guide Profloor Dynamic Batten Type 55/67/81/91", Proctor Group Ltd, Apr. 2016, 2 pages.
Anonymous, "AacerCush 1+", Aacer Sports Flooring, Mar. 2015, 1 page.
Anonymous, "AacerCush 1" Aacer Sports Flooring, Apr. 2016, 5 pages.
Anonymous, "SuperBond Flex", Aacer Sports Flooring, Aug. 2014, 1 page.
Anonymous, "AacerFlex", Aacer Sports Flooring, Aug. 2014, 3 pages.
Anonymous, "Performance Pads", Aacer Sports Flooring, Apr. 2016, 4 pages.
Anonymous, "TriPower Pad", Aacer Sports Flooring, Aug. 2014, 2 pages.
Anonymous, "CRC 950", Acousticork Products, Apr. 2016, 1 pages.
Anonymous, "Anchored RezillSleeper DIN," Apr. 2016, 1 page.
J. Migneron et al., "Global Understanding of important parameters for improvement of impact insulation", Acoustical Society of America, Proceedings of Meetings on Acoustics, vol. 19, Jun. 2013, 9 pages.
Anonymous, "Acoustic Panels Quiet Floor NP Noise Control Floor Underlayment", Acoustical Surfaces, Inc., Apr. 2016, 4 pages.
Anonymous, "Supended Wood Sports Floor Systems—Legacy", Horner Sports Flooring Company, Apr. 2016, 3 pages.
Anonymous, "Thrust-A-Cushion Sleeper Subfloor", Horner Flooring, Aug. 2006, 4 pages.
Anonymous, "Air-Channel Classic (With Subfloor-Anchored)", Robbins Sports Surfaces, Apr. 2016, 2 pages.
Anonymous, "Plyboo Sport", Plyboo Sport, Apr. 2016, 1 page.
Anonymous, "AacerCush 11", Aacer Sports Flooring, Feb. 2016, 2 pages.
Anonymous, "AacerFlex", Aacer Sports Flooring, Feb. 2016, 2 pages.
ISA/KSR, "International Search Report and Written Opinion of The International Searching Authority", Counterpart International Patent Application No. PCT/US2016/056524, dated Apr. 21, 2017, 14 pages.
Anonymous, "Soybond Manufactured FSC and FloorScore Certified Formaldehyde Free", Jun. 1, 2011, 18 pages.

* cited by examiner

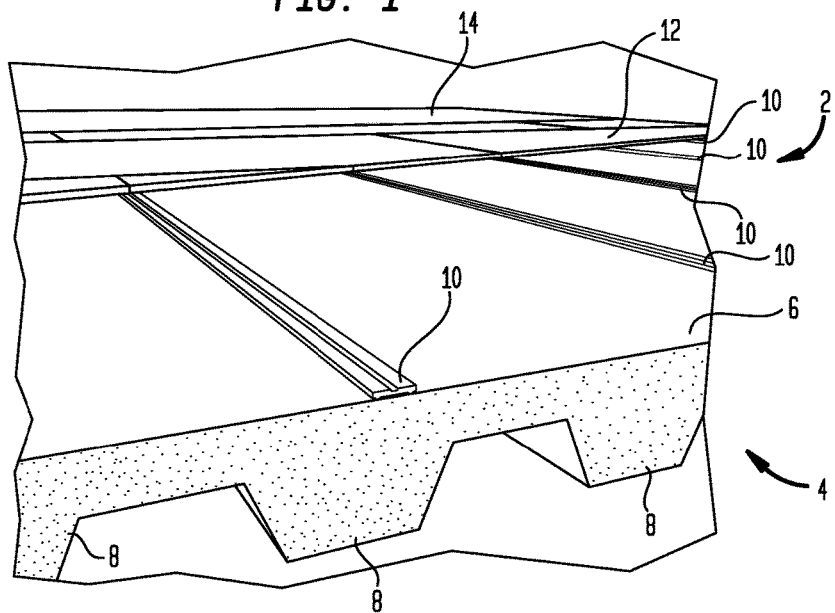
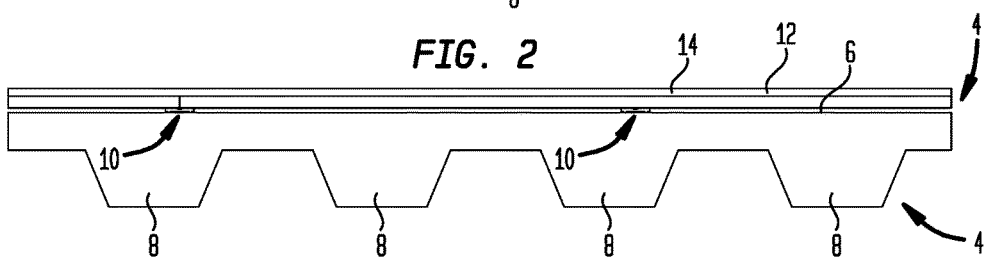
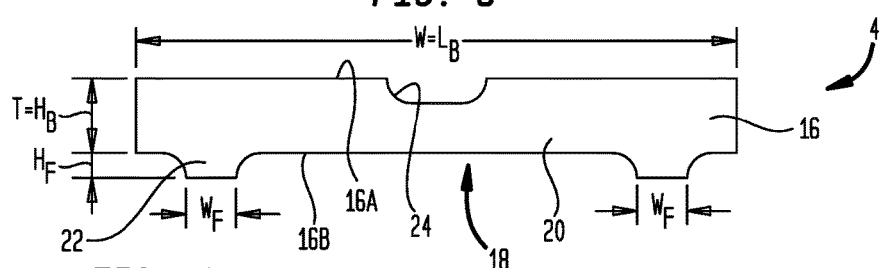
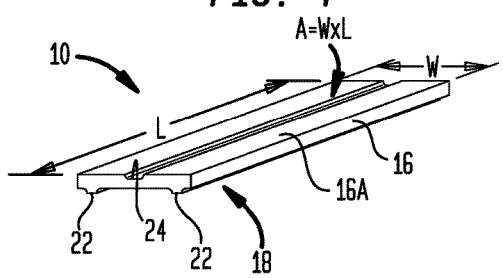
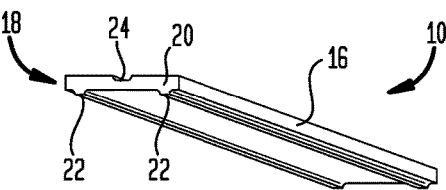

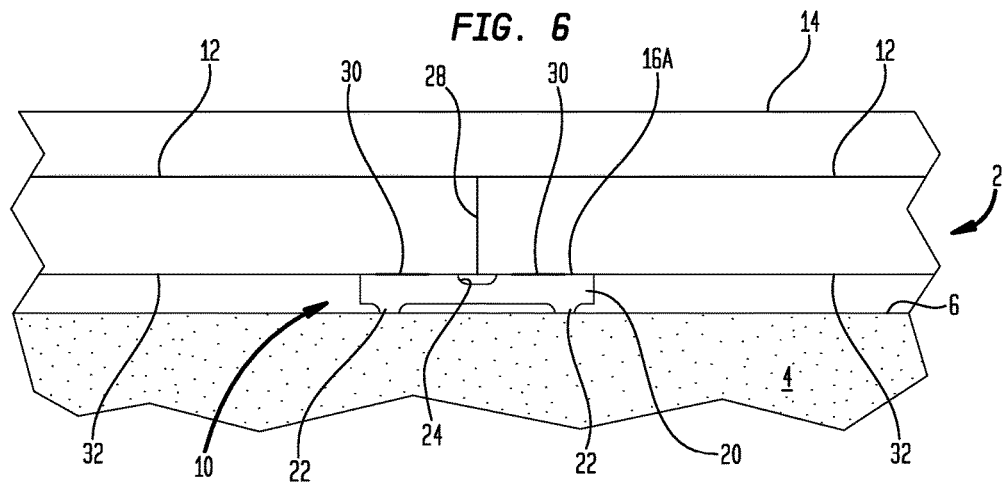
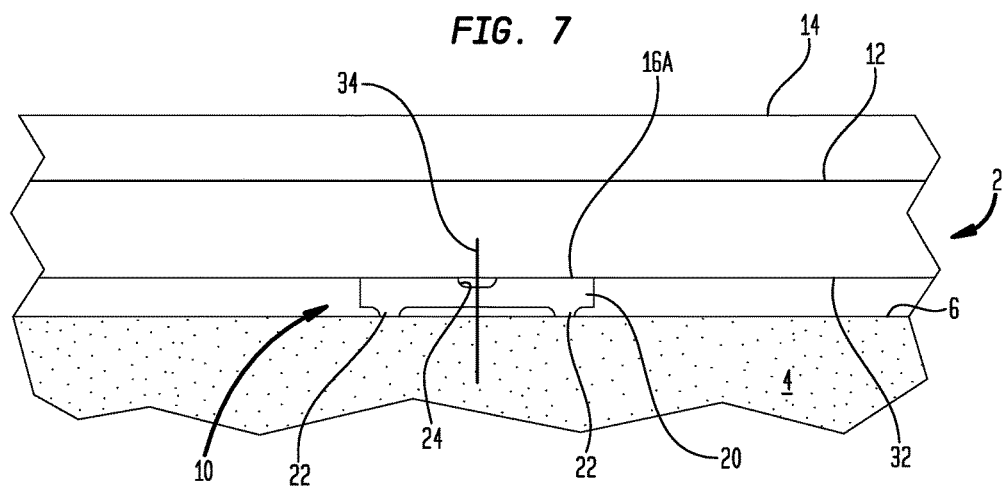
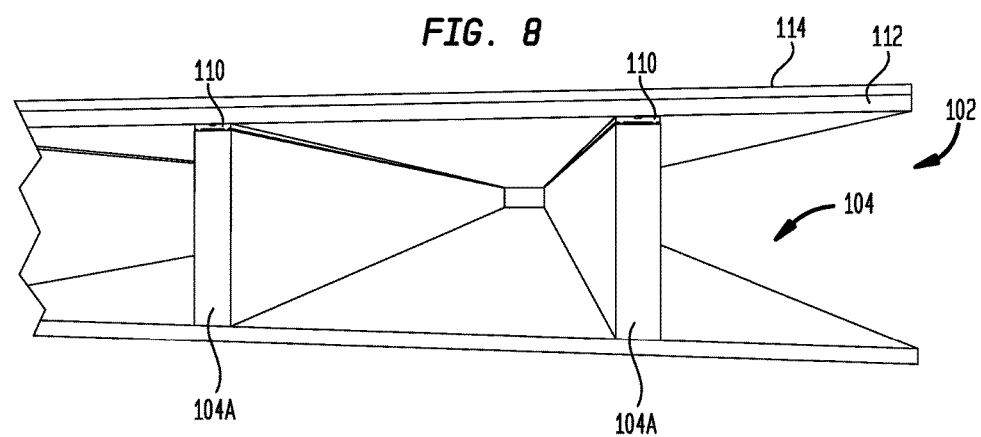

ACOUSTIC SLEEPER

BACKGROUND

1. Field

The present disclosure relates to sound suppression and acoustical privacy in architectural structures. More particularly, the disclosure is directed to noise attenuation in architectural flooring.

2. Description of the Prior Art

By way of background, commercial building codes typically impose acoustic privacy restrictions that limit the amount of noise permitted to pass through floor assemblies. For example, section 1207.3 of the International Building Code (IBC) imposes the following requirement for structure-borne sound:

"Floor/ceiling assemblies between dwelling units or between a dwelling unit and a public or service area within the structure shall have an impact insulation class (IIC) rating of not less than 50 (45 if field tested) when tested in accordance with ASTM E 492."

Various noise suppression techniques have been proposed for improving floor assembly acoustic noise characteristics. Most involve the installation of acoustic isolating material above or below subfloors and underlayments. In some cases, the acoustic isolating material is formed as a flat pad or strip and mounted to the bottom of a sleeper or batten made from wood or other material. Other types of acoustic isolating material include rubber underlayment, dimpled rubber mats and noise proofing joist tape.

It is to improving the attenuation of noise in architectural flooring that the present disclosure is directed. In particular, a novel acoustic sleeper is proposed for use in floor structures built either on concrete slabs or wooden support joists.

SUMMARY

In a first aspect of the disclosure, an acoustic sleeper is provided for sound suppression in a floor assembly. The acoustic sleeper may be formed as a solid sleeper body made entirely from an elastomeric acoustic isolating material. The sleeper body has a sleeper body thickness (T), a sleeper body width (W) substantially larger than the sleeper body thickness, a sleeper body length (L), and a generally rectangular cross-section having a cross-section width given by (W) and a cross-section height given by (T). The sleeper body has a first side and a second side. The sleeper body first side has a first side area (A) given by (A=W×L). The sleeper body first side includes a first sleeper load-bearing surface for contacting a first floor assembly structure, the first sleeper load-bearing surface having a first load-bearing surface area that is equal to or less than the first side area. The sleeper body second side has a pair of solid sleeper feet extending therefrom. The sleeper feet collectively provide a second sleeper load-bearing surface for contacting a second floor assembly structure. The second sleeper load-bearing surface has a second load-bearing surface area that is less the first side area by at least a factor of three.

In a second aspect of the disclosure, a floor assembly with improved sound suppression includes a support structure. A set of acoustic sleepers as summarized above are arranged directly on the support structure so as to be in contact therewith. A set of subfloor panels is supported directly on the acoustic sleepers so as to be in contact therewith. A floor is supported on the subfloor panels.

In a third aspect of the disclosure, a floor assembly installation method includes installing a support structure, placing a set of acoustic sleepers as summarized above directly on the support structure so as to be in contact therewith, installing a set of subfloor panels directly on the acoustic sleepers so as to be in contact therewith, and installing a floor on the subfloor panels.

BRIEF DESCRIPTION OF THE DRAWINGS

The foregoing and other features and advantages will be apparent from the following more particular description of example embodiments, as illustrated in the accompanying Drawings, in which:

FIG. 1 is a fragmentary perspective view of a floor assembly having a set of example acoustic sleepers disposed on a concrete support slab and supporting a wooden subfloor that in turn supports a floor;

FIG. 2 is a front elevation view of the floor assembly of FIG. 1;

FIG. 3 is an enlarged end view of one of the acoustic sleepers of FIG. 1;

FIG. 4 is a top perspective view of one of the acoustic sleepers of FIG. 1;

FIG. 5 is a bottom perspective view of one of the acoustic sleepers of FIG. 1;

FIG. 6 is an enlarged fragmentary end view of one of the acoustic sleepers of FIG. 1 showing a first example method of installing the acoustic sleeper between the wooden subfloor and the concrete support slab;

FIG. 7 is an enlarged fragmentary end view of one of the acoustic sleepers of FIG. 1 showing a second example method of installing the acoustic sleeper between the wooden subfloor and the concrete support slab;

FIG. 8 is a fragmentary perspective view of a floor assembly that includes a set of example acoustic sleepers disposed on a wooden joist support deck and supporting a wooden subfloor that in turn supports a floor;

DETAILED DESCRIPTION OF EXAMPLE EMBODIMENTS

Figure 9:
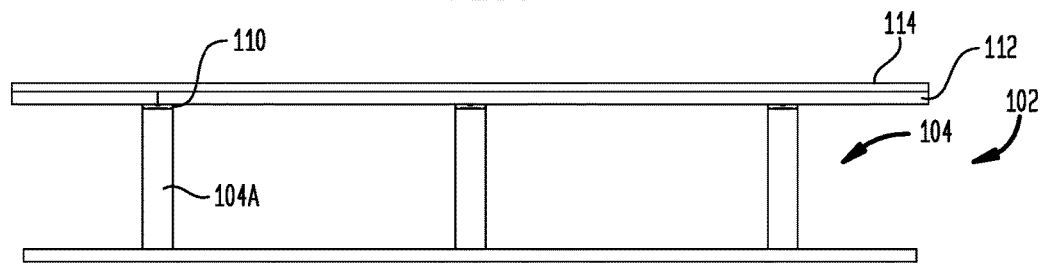
FIG. 9 is a front elevation view of the floor assembly of FIG. 8.

Turning now to the drawing figures, wherein like reference numbers are used to indicate like structure in all of the several views, FIGS. 1 and 2 illustrate a floor assembly 2 constructed in accordance with a first example embodiment of the present disclosure. In the illustrated embodiment, the floor assembly 2 includes a concrete support slab 4 having an upper support surface 6 and a set of integral beam members 8 to provide structural rigidity and load bearing capacity as may be required for the intended application. Acoustic sleepers 10 are arranged in parallel rows on the upper surface 6 of the concrete support slab 4. Subfloor panels 12 of any suitable type (e.g., plywood, OSB (oriented strand board), or similar material) are supported on the acoustic sleepers 10. A floor 14 of any suitable type (e.g., hardwood, engineered wood, tile or other materials) is supported on the subfloor panels 12.

The spacing of the acoustic sleepers 10 may be selected according to the size, thickness and material of the subfloor panels 12. If the subfloor panels 12 are configured as 4 ft.×8 ft. plywood or OSB sheets, as is typical, the acoustic sleepers 10 may be spaced to align with the edges of the subfloor panels. This will either be a 4 ft. spacing or an 8 ft. spacing, depending on the orientation of the subfloor panels 12 relative to the acoustic sleepers 10. For example, in FIGS. 1 and 2, the subfloor panels 12 are arranged so that their short (4 ft.) edges are parallel to the lengthwise orientation of the acoustic sleepers 10. Placing an acoustic sleeper 10 every 8 ft. will thus ensure that the short edges of the subfloor panels 12 are supported. In addition to these "edge" sleepers, additional intermediate acoustic sleepers 10 may be placed between the edge sleepers to prevent unwanted subfloor panel flexing. In FIGS. 1 and 2, additional intermediate acoustic sleepers 10 are placed at the midspan of the subfloor panels 12, such that the overall acoustic sleeper spacing is 4 ft. It will be appreciated that a narrower acoustic sleeper spacing may be used if additional subfloor panel support is required.

Turning now to FIGS. 3-5, an example configuration that may be used for the acoustic sleepers 10 is shown. Each acoustic sleeper 10 may be constructed as a solid sleeper body 16 formed entirely from an elastomeric acoustic isolating material. One example of such a material is solid neoprene rubber having a Shore A durometer hardness of between about 35-55. As shown in FIG. 3, the sleeper body 16 has a nominal sleeper body thickness "T" extending between a sleeper body first side 16A and a sleeper body second side 16B. The sleeper body 16 further has a nominal sleeper body width "W" that may be substantially larger than the sleeper body thickness "T." As shown in FIG. 4, the sleeper body 16 also has a nominal sleeper body length "L." In the illustrated embodiment, the sleeper body 16 is configured as an elongated sleeper rail whose sleeper body length "L" may be substantially larger than the sleeper body "W." In alternative embodiments (described in more detail below), the sleeper body 16 may be configured as a pad whose sleeper body length "L" is generally the same as the sleeper body "W." The acoustic sleepers 12 may be manufactured in any suitable manner, such as by extrusion or molding.

With respect to the sleeper body length dimension, if the sleeper body 16 is configured as an elongated sleeper rail, the length "L" may be on the order of 44 in. so as to be suitable for use with standard subfloor panels 12 having a 48 in. short edge dimension. In that case, if the sleepers 10 are arranged parallel to the short edge dimension of the subfloor panels 12, there will be a 2 in. space at each end of the sleeper body 16. This space allows additional sleepers 10 to be placed along the long edges of the subfloor panels 12. The sleeper body width "W" may be on the order of 1.5 in., which is convenient for mounting the sleepers 10 on standard floor joists comprising 2 by "x" material (see FIGS. 8-11, discussed below). The sleeper body thickness "T" may be on the order of 0.156 in., which provides a low profile geometry that does not substantially increase the overall thickness of the floor assembly 2.

As noted, the sleeper body length "L" may be substantially larger than the sleeper body width "W." For example, if the sleeper body length "L" is 44 in. and the sleeper body width "W" is 1.5 in., the length "L" will be approximately 30 times larger than the width "W." If the sleeper body length "L" is shorter, say 24 in., it would still be approximately 15 times larger than the sleeper body width "W." The sleeper body length "L" could be shorter still, but more acoustic sleepers 10 would be required per subfloor panel 12. In the installation of FIGS. 1 and 2, the sleeper body length "L" is 44 in., such that only three acoustic sleepers 10 are required per subfloor panel 12, one for each short edge of the subfloor panel and one for mid-span support halfway between the two short edge sleepers. As also noted above, the sleeper body width "W" may be substantially larger than the sleeper body thickness "T." For example, if the sleeper body width "W" is 1.5 in. and the sleeper body thickness "T" is 0.156 in., the sleeper body width will be approximately ten (10) times larger than the sleeper body thickness.

As best shown in FIG. 3, the sleeper body 16 may have a generally rectangular sleeper cross-section 18 having a cross-section width given by "W" and a cross-section height given by "T." The sleeper cross-section 18 defines a cross-section beam member 20 that may be supported on a pair of spaced apart sleeper feet 22. The cross-section beam member 20 has a cross-section beam length "$L_B$" (corresponding to the sleeper body width "W") and a cross-section beam height "$H_B$" (corresponding to the sleeper body thickness "T"). The sleeper feet 22 may be made of the same acoustic isolating material as the sleeper body 16, and may be integral therewith. They extend perpendicularly from the sleeper body second side 16B and may be of substantially rectangular cross-section. The sleeper feet 22 are preferably of solid construction so as to provide substantially non-deflectable support for the cross-section beam member 20 (apart from the compressibility of the sleeper material itself) when the sleeper 10 is installed in the floor assembly 2 in the manner shown in FIGS. 1 and 2 (i.e., with the sleeper in a foot-down orientation). As shown in FIGS. 4 and 5, the sleeper feet 22 may extend parallel to each other continuously for the entire length "L" of the sleeper body 18. In this configuration, with the two sleeper feet 22 extending downwardly from the sleeper body 16 and parallel to each other, the overall sleeper cross-section will be generally pi-shaped. In alternative embodiments, the sleeper feet 22 could be non-continuous and/or non-parallel to each other.

The sleeper feet 22 each have a cross-section foot height "$H_F$" and a cross-section foot width "$W_F$". Because there are two sleeper feet 22 in the illustrated embodiment, the collective sleeper foot width is "$2W_F$." The overall thickness of the sleeper 10 is defined by the cross-section beam height "$H_B$" (corresponding to the sleeper body thickness "T") combined with the sleeper foot height "$H_F$." As previously noted, the sleeper body width "W" is defined by the cross-section beam length "$L_B$."

It may be seen in FIG. 4 that the sleeper body first side 16A has a first side area "A" given by "A"="W"×"L," where "W" is the sleeper body width and "L" is the sleeper body length. As may be additionally seen in FIG. 3, the sleeper body first side 16A includes a first sleeper load-bearing surface for contacting a first floor assembly structure, such as the subfloor panels 12 shown in FIG. 1. Alternatively, if the sleepers 10 were inverted from the illustrated foot-down orientation to a foot-up orientation, the first sleeper load-bearing surface would contact the upper support surface 6 of the concrete slab 4.

The first sleeper load-bearing surface has a corresponding first load-bearing surface area that is equal to or less than the first side area. In the embodiment of FIGS. 3 and 4, the first sleeper load-bearing surface area is less than the first side area due to the presence of a central channel 24 that may be provided in the sleeper body first side 16A (as described in more detail below). By way of example, if the central channel 24 is 0.25 in. wide and the sleeper body width "W" is 1.5 in., the first sleeper load-bearing surface area will be 1.25 in. times the sleeper body length "L." Widening the central channel 24 would further reduce the first load-bearing surface area relative to the first side area. On the other hand, if the central channel 24 was not present, the first sleeper load bearing surface area would be equal to the first side area.

As shown in FIG. 3, the sleeper feet 22 collectively provide a second sleeper load-bearing surface for contacting a second floor assembly structure, such as the upper support surface 6 of the concrete slab 4 shown in FIG. 1. Alternatively, if the sleepers 10 were inverted from the illustrated foot-down orientation to a foot-up orientation, the second sleeper load-bearing surface would contact the subfloor panels 12. The second load-bearing surface area is given by the collective sleeper foot width of "$2W_F$" times the sleeper body length "L," as may be seen in FIG. 5.

Applicant has determined that it is advantageous to minimize the sleeper foot width "$W_F$" relative to the sleeper width "W" in order to maximize the acoustic isolation properties of the acoustic sleepers 10. In the illustrated embodiment, the sleeper foot width "$W_F$" may be on the order of 0.125 in. If the sleeper body width "W" is on the order of 1.5 in., it will be approximately twelve times larger than the sleeper foot width "$W_F$" and approximately six times larger than the collective width "$2W_F$" of both sleeper feet 22. Correspondingly, if the sleeper feet 22 extend continuously for the entire length "L" of the sleeper 16, the second load-bearing surface area (given by "$2W_F$"×"L") will be less than the first side area (given by "W"×"L") by a factor of approximately six. Making the sleeper feet 22 non-continuous would further decrease the second load-bearing surface area relative to the first side area. Applicant has determined that superior acoustic isolation may be achieved if the second load-surface area is less than the first side area by at least a factor of three, with a factor of at least approximately six being preferred.

If each subfloor panel 12 has a lengthwise span of 8 ft. (96 in.) supported by three acoustic sleepers 10 extending parallel to the subfloor short edges, each sleeper having two sleeper feet 22 providing a collective foot width "$2W_F$" of 2×0.125 in.=0.25 in., the 8 ft. subfloor panel span will be supported by a total combined foot width of 3×0.25 in.=0.75 in. The subfloor panel span will thus be 96 in./0.75 in.=128 times larger than the total combined foot width "$W_F$" that supports the span. By comparison, if three 1.5 in. wide flat sleepers having no sleeper feet were used, the 96 in. subfloor panel would be supported by a total sleeper width of 4.5 in., such that the subfloor panel span would be only 96 in./4.5 in.=21 times larger than the total sleeper width that supports the span.

The thickness "T" of the sleeper body 16 should be large enough to provide an adequate cross-section beam height "$H_B$" to support anticipated floor assembly design loads without the mid-span of the cross-section beam member (halfway between the sleeper fee 22) sagging to the point where it contacts the underlying floor assembly structure. The foot height "$H_F$" will be a factor because it dictates the nominal spacing between the sleeper body second side 16B and the underlying floor assembly structure. The cross-section beam length "$L_B$" will also be a factor, as will the spacing of the sleeper feet 22 that support the cross-section beam member 20. The latter parameter affects the maximum bending moment that must be reacted by the cross-section beam 20, at least when the sleepers 10 are positioned in the foot-down orientation shown in FIGS. 1-5. If the sleepers 10 were inverted to a foot-up orientation, the sleeper body first side 16A would be fully supported by the underlying floor assembly structure. In that case, the cross-section beam length "$L_B$," the sleeper feet spacing, and the sleeper body thickness "T" would not be as critical because the cross-section beam 20 would not be raised from the underlying floor assembly structure, and thus not subject to bending.

The previous observation that the width "$W_F$" of the sleeper feet 22 should be as small as possible for good acoustic isolation will be tempered by the foregoing design considerations. The sleeper feet should not be so thin that they buckle under design loads at the foot height "$H_F$" needed to prevent the mid-span of the cross-section beam member 20 from sagging into contact with the underlying floor assembly structure. As noted above, increasing the sleeper body thickness "T" and/or limiting the spacing of the sleeper feet 22 will reduce the mid-span deflection of the cross-section beam member 20, and thus the required foot height "$H_F$." On the other hand, the sleeper body should not be so thick as to unduly raise the subfloor structure, and the foot spacing should not be so small as to compromise sleeper stability by allowing rocking or pivoting. Preferably, the geometry of the sleepers 10 will be optimized for maximum acoustic isolation while taking into account the foregoing design considerations.

In an example configuration, the foot height "$H_F$" may be at least one-half the sleeper body thickness "T" to maintain adequate spacing between the cross-section beam 20 and the underlying floor assembly structure while accounting for localized compression of the sleeper feet 22 due to point loads. At the same time, the foot height "$H_F$" need not exceed the sleeper body thickness "T" lest the sleeper feet 22 become susceptible to buckling. This assumes that the sleeper feet 22 are relatively thin, such as when the second load-bearing surface area is less than the first side area by at least a factor of six (as noted above). In the embodiment of FIG. 3, the sleeper body thickness "T," and thus the cross-section beam height "$H_B$," may be 0.156 in., and the foot height "$H_F$" may be 0.94 in. In that case, the foot height "$H_F$" will be 0.6 times the cross-section beam height "$H_B$" of 0.156 in.

In an example configuration, the sleeper body thickness "T" may be equal to or greater than about one-eighth the sleeper foot spacing to reduce undue mid-span sagging. The span of the cross-section beam member 20 may be reduced by spacing the sleeper feet 22 inboard from the sides of the cross-section beam member 20. This will further increase the beam member's load bearing capacity. In the illustrated embodiment, the beam member length "$L_B$" may be on the order of 1.5 in. The distance from the sides of the cross-section beam member 20 to the outboard edge of each sleeper foot 22 may be on the order of 0.125 in. If the sleeper foot width "$W_F$" is 0.125 in., there would be a beam member span distance of 1.0 in. between the inside edges of the sleeper feet 22. If this 1.0 in. spacing is used, and if the sleeper body thickness "T" is 0.156 in., the latter dimension will be more than one-eighth the former dimension. The ratio of the inside span distance to the cross-section beam length "$L_B$" would be approximately 1.0 in./1.5 in.=0.67, such that the inside span distance is approximately 67% of the cross-section beam length "$L_B$."

As can be seen in each of FIGS. 3-5, the sleeper rail 16 may have a central channel 24 formed on the first side 16A of the sleeper body 16. As described in more detail below, the central channel 24 is useful for recessing fasteners that may be used when installing the sleepers 10. As best shown in FIGS. 4 and 5, the central channel 24 may extend for substantially the entirety of the sleeper rail length "L." Alternatively, the central channel 24 could be intermittent, being formed for example as a series of discrete central pockets along the sleeper rail length "L." In the illustrated embodiment, the central channel 24 may have a width of 0.125 in.

As noted above, and with reference to FIGS. 4 and 5, the sleeper feet 22 may extend parallel to each other for substantially the entirety of the sleeper rail length "L." Alternatively, the sleeper feet 22 could be formed for example as a series of discrete sleeper feet spaced from each other along the sleeper rail length "L." They could also be non-parallel.

Turning now to FIGS. 6 and 7, two example method embodiments are shown for installing the acoustic sleepers 10 between the concrete support slab 4 and the subfloor panels 12 of the floor assembly 2. One method embodiment uses adhesive bonding, and the other method embodiment uses mechanical fastening.

In FIG. 6, an acoustic sleeper 10 is disposed below a seam 28 representing the abutting edges of two adjacent subfloor panels 12. Two adhesive bonds 30 respectively secure the sleeper body first side 16A directly to the lower surfaces 32 of the subfloor panels 10 so as to be in contact therewith. The bottoms of the sleeper feet 22 rest directly on the upper surface 6 of the concrete support slab 4 so as to be in contact therewith. No adhesive is required at these locations, but may be provided if desired.

Any suitable adhesive that is compatible with the materials of the attached components may be used to form the adhesive bonds 30 of FIG. 6. If desired, the adhesive could be provided by double-sided adhesive strips. One side of the adhesive strips 30 may be pre-adhered to the acoustic sleeper 10. The other side of the adhesive strips 30 may be covered by a peelable backing that is removed to expose the underlying adhesive during installation of the acoustic sleeper 10.

It will be further seen in FIG. 6 that the subfloor panel seam 28 may be centered on the central channel 24 of the acoustic sleeper 10, such that the central channel is disposed directly under the abutting edges of two adjacent subfloor panels 12. Insofar as the acoustic sleeper 10 may be placed on the concrete support slab 4 before the subfloor panels 12 are attached to the acoustic sleeper, the central channel 24 can be used as a visual guide for centering the subfloor panel seam 28 over the acoustic sleeper.

In FIG. 7, an acoustic sleeper 10 is disposed below a subfloor panel 12 at a location between its edges. A fastener 34, such as staple, may be used to fasten the acoustic sleeper 10 directly to the subfloor panel 12 so as to be in contact therewith, with the sleeper body first side 16A abutting the lower surface 32 of the subfloor panel 10. For this installation, the acoustic sleeper 10 will be fastened to the subfloor panel 12 prior to the acoustic sleeper being placed on the concrete subfloor 4.

It will be understood and appreciated that the use of adhesive and fasteners in the respective installations of FIGS. 6 and 7, may be reversed, with fasteners being used in the installation of FIG. 6 and adhesive being used in the installation of FIG. 7. It would also be possible to combine the use of fasteners and adhesive if so desired.

Turning now to FIGS. 8 and 9, a floor assembly 102 is constructed in accordance with a second example embodiment of the present disclosure. In this embodiment, the floor assembly 102 includes a wooden joist support deck 104 having a set of wooden floor joists 104A arranged in parallel rows. The remaining components of the floor assembly 102 correspond to the components of the floor assembly 2 described above. This correspondence of components is indicated by the use of corresponding reference numbers incremented by "100." Acoustic sleepers 110 are arranged directly on the upper sides of the joists 104A so as to be in contact therewith. Subfloor panels 112 of any suitable type (e.g., plywood, OSB (oriented strand board) or similar material) are supported directly on the acoustic sleepers 110 so as to be in contact therewith. A floor 114 of any suitable type (e.g., hardwood, engineered wood, tile or other materials) is supported on the subfloor panels 112.

The acoustic sleepers 110 may be constructed in the same manner as the acoustic sleepers 10 described above in connection with FIGS. 3-5. A detailed description of the configuration of the acoustic sleepers 110 will therefore not be repeated. Advantageously, if the sleeper width "W" is 1.5 in., this will allow the acoustic sleepers 110 to fit within the nominal 1.5 in. thickness dimension of the floor joists 104A, which will typically be 2 by "x" material. The acoustic sleepers 110 may be laid lengthwise end-to-end on the floor joists 104A, with or without any gaps between the ends of adjacent pairs of acoustic sleepers.

Figure 10:
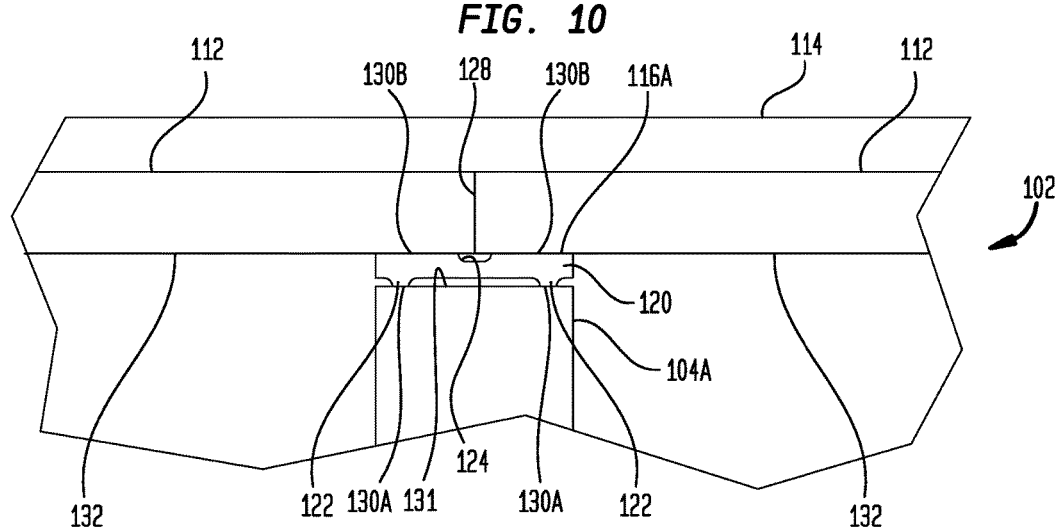
FIG. 10 is an enlarged fragmentary view of one of the acoustic sleepers of FIG. 8 showing a first example method of installing the acoustic sleeper between the wooden subfloor and the wooden joist support deck.
Figure 11:
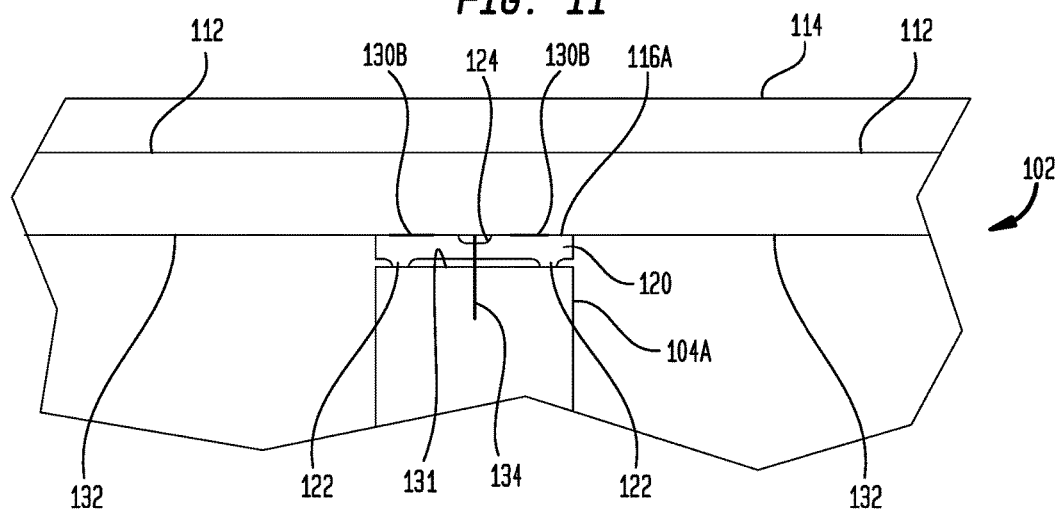
FIG. 11 is an enlarged fragmentary end view of one of the acoustic sleepers of FIG. 8 showing a second example method of installing the acoustic sleeper between the wooden subfloor and the wooden joist support deck.

Turning now to FIGS. 10 and 11, two example method embodiments are shown for installing the acoustic sleepers 110 between the wooden joist support deck 104 and the subfloor panels 112 of the floor assembly 102. One method embodiment uses adhesive bonding, and the other method embodiment uses a combination of adhesive bonding and mechanical fastening.

In FIG. 10, an acoustic sleeper 110 is disposed below a seam 128 representing the abutting edges of two adjacent subfloor panels 112. Adhesive bonds are used for attaching the acoustic sleeper 110 above and below. Two lower adhesive bonds 130A may be used to secure the bottom of the acoustic sleeper's sleeper feet 122 directly to the upper surface 131 of the wooden floor joist 104A so as to be in contact therewith. Two upper adhesive bonds 130B respectively secure the sleeper body first side 116A directly to the lower surfaces 134 of the subfloor panels 110 so as to be in contact therewith.

As in the case of the floor assembly 2 described above, any suitable adhesive that is compatible with the materials of the attached components may be used to form the adhesive bonds 130A and 130B of FIG. 10. Moreover, if desired, the adhesive could be provided by double-sided adhesive strips. One side of the adhesive strips 130A and 130B may be pre-adhered to the acoustic sleeper 110. The other side of the adhesive strips 130A and 130B may be covered by a peelable backing that is removed to expose the underlying adhesive during installation of the acoustic sleeper 110.

It will be further seen in FIG. 10 that the subfloor panel seam 128 may be centered on the central channel 124 of the acoustic sleeper 110, such that the central channel is disposed directly under the abutting edges of two adjacent subfloor panels 112. Insofar as the acoustic sleeper 110 may be attached to the wooden floor joist 104A before the subfloor panels 112 are attached to the acoustic sleeper, the central channel 124 can be used as a visual guide for centering the subfloor panel seam 128 over the acoustic sleeper.

In FIG. 11, an acoustic sleeper 110 is disposed below a subfloor panel 112 at a location between its edges. Two adhesive bonds 130B secure the sleeper body first side 116A directly to the lower surface 134 of the subfloor panel 112 so as to be in contact therewith. A fastener 134, such as staple, is used to fasten the acoustic sleeper 110 directly to the wooden floor joist 104A so as to be in contact therewith, with the bottom of the sleeper feet 122 abutting the upper surface 131 of the wooden floor joist 104A. For this installation, the acoustic sleeper 110 will be fastened to the wooden floor joist 104A prior to the acoustic sleeper being placed on or secured to the subfloor panel 112 (e.g., using the adhesive bonds 130B). As in the installation of FIG. 6, the adhesive bonds 130B may be provided by adhesive strips that are pre-attached to the acoustic sleeper 110.

It will be understood and appreciated that the use of adhesive and fasteners in the respective installations of FIGS. 10 and 11, may be reversed, with fasteners being used in the installation of FIG. 10 and adhesive being used in the installation of FIG. 11. FIG. 11 illustrates that it is possible to combine the use of fasteners and adhesive if so desired.

Figure 12:
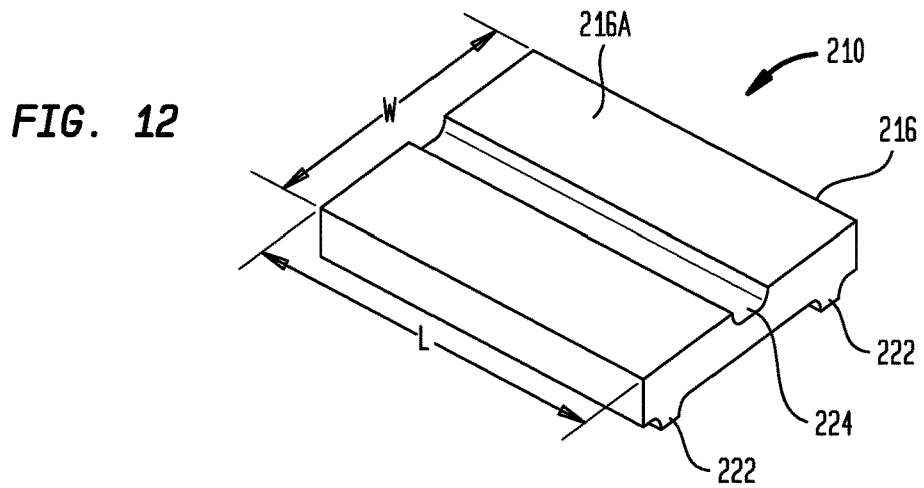
FIG. 12 is an upper side perspective view showing a first alternative acoustic sleeper.
Figure 13:
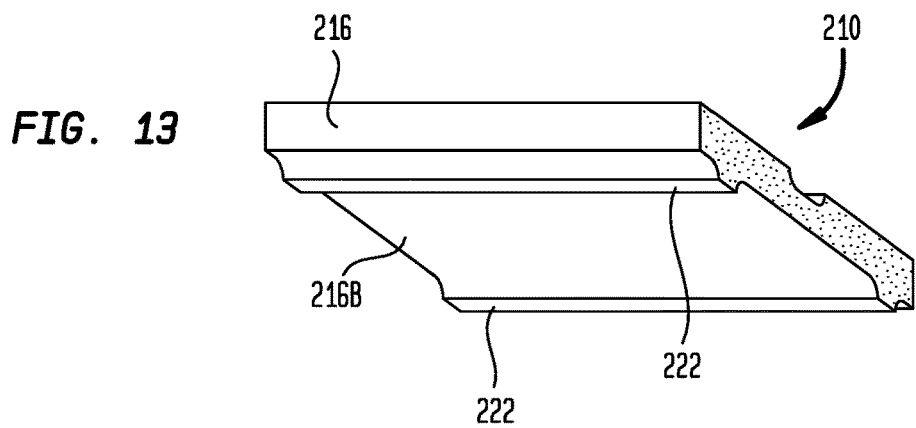
FIG. 13 is a lower side perspective view showing the first alternative acoustic sleeper of FIG. 12.

Turning now to FIGS. 12 and 13, an alternative acoustic sleeper 210 is similar in all respects to the acoustic sleeper 10 described above, except that the acoustic sleeper 210 is not configured as an elongated sleeper rail. Instead, the acoustic sleeper 210 is substantially shorter in length (e.g., with a sleeper body length "L" of about 2 in.) so as to be generally square (e.g., with a sleeper body width "W" of about 1.5 in). The acoustic sleeper 210 is thus in the nature of a sleeper pad.

Figure 14:
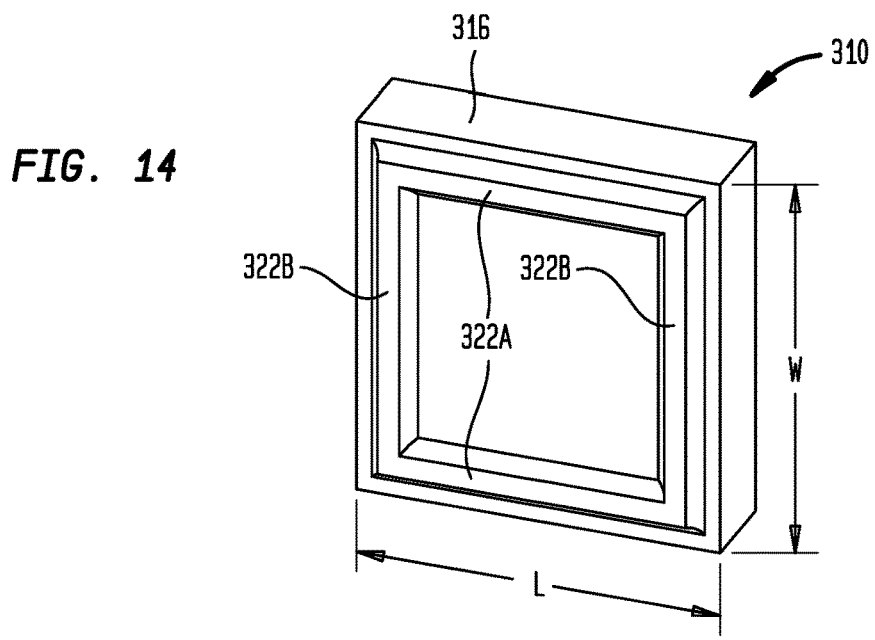
FIG. 14 is a lower side perspective view showing a second alternative acoustic sleeper.

FIG. 14 shows a further alternative acoustic sleeper 310 that is similar to the acoustic sleeper 210 except that it includes two sets of sleeper feet 322A and 322B. The sleeper feet 322A and 322B are perpendicular to each other, and may be connected at their ends to provide a rectangular foot configuration. The sleeper feet 322A extend parallel to each other for substantially the entirety of the sleeper body length "L." The sleeper feet 322B extend parallel to each other for substantially the entirety of the sleeper body width "W." Alternatively, the sleeper feet 322A and 322B could be non-continuous.

Although not shown, further alternative acoustic sleeper embodiments may be provided in which the sleeper feet are not linear members. By way of example, such embodiments could have sleeper feet in the nature of a pattern of bumps, posts or the like.

Accordingly, an acoustic sleeper for sound suppression in a floor assembly has been disclosed, together with alternative floor assembly constructions and installation methods. While various embodiments of the invention have been described, it should be apparent that many variations and alternative embodiments could be implemented in accordance with applicant's invention. For example, as noted in the discussion above, the sleepers could be installed in the foot-down orientation shown in the drawing figures, or they could be inverted and installed in a foot-up orientation. It is understood, therefore, that the invention is not to be in any way limited except in accordance with the spirit of the appended claims and their equivalents.

What is claimed is:

1. An acoustic sleeper for sound suppression in a floor assembly, comprising:
   a solid sleeper body formed entirely from an elastomeric acoustic isolating material;
   said sleeper body having a sleeper body thickness (T), a sleeper body width (W) substantially larger than said sleeper body thickness, a sleeper body length (L), and a generally rectangular cross-section having a cross-section width equal to W a cross-section height equal to T;
   said sleeper body having a first side and a second side;
   said sleeper body first side having a first side area (A) equal to W×L, said sleeper body first side including a first sleeper load-bearing surface for contacting a first floor assembly structure, said first sleeper load-bearing surface having a first load-bearing surface area that is equal to or less than said first side area;
   said sleeper body second side comprising a pair of solid sleeper feet extending therefrom, said sleeper feet being parallel to each other and arranged such that said sleeper body and said sleeper feet define an overall sleeper cross-section that is generally pi-shaped;
   said sleeper feet extending continuously or non-continuously longitudinally along said sleeper body length and collectively providing a second sleeper load-bearing surface for contacting a second floor assembly structure;
   said sleeper body second side having a longitudinally-extending central channel formed between said sleeper feet; and
   said second sleeper load-bearing surface having a second load-bearing surface area that is less than said first side area by at least a factor of three.

2. The acoustic sleeper of claim 1, wherein said second load-bearing surface area is less than said first side area by at least a factor of six.

3. The acoustic sleeper of claim 1, wherein said sleeper feet have a foot height that does not exceed said sleeper body thickness.

4. The acoustic sleeper of claim 1, wherein said sleeper body has a longitudinally-extending central channel formed in said first sleeper load-bearing surface that reduces said first load-bearing surface area to less than said first side area.

5. The acoustic sleeper of claim 1, wherein said sleeper feet extend parallel to each other for substantially the entirety of said sleeper body length.

6. The acoustic sleeper of claim 5, wherein said sleeper body second side further comprises a second pair of sleeper feet extending therefrom, said second pair of sleeper feet extending parallel to each other for substantially the entirety of said sleeper body width.

7. The acoustic sleeper of claim 1, wherein said sleeper body length is approximately 30 times larger than said sleeper body width.

8. A floor assembly, comprising:
   a support structure;
   a set of acoustic sleepers arranged directly on said support structure so as to be in contact therewith;
   a set of subfloor panels supported directly on said acoustic sleepers so as to be in contact therewith;
   a floor supported on said subfloor panels; and
   each of said acoustic sleepers comprising:
      a solid sleeper body formed entirely from an elastomeric acoustic isolating material;
      said sleeper body having a sleeper body thickness (T), a sleeper body width (W) substantially larger than said sleeper body thickness, a sleeper body length (L), and a generally rectangular cross-section having a cross-section width equal to W and a cross-section height equal to T;

said sleeper body having a first side and a second side;
said sleeper body first side having a first side area (A) equal to W×L, said sleeper body first side including a first sleeper load-bearing surface contacting said subfloor panels, said first sleeper load-bearing surface having a first load-bearing surface area that is equal to or less than said first side area;
said sleeper body second side comprising a pair of solid sleeper feet extending therefrom, said sleeper feet being parallel to each other and arranged such that said sleeper body and said sleeper feet define an overall sleeper cross-section that is generally pi-shaped;
said sleeper feet extending continuously or non-continuously longitudinally along said sleeper body length and collectively providing a second sleeper load-bearing surface contacting said support structure;
said sleeper body second side having a longitudinally-extending central channel formed between said sleeper feet; and
said second sleeper load-bearing surface having a second load-bearing surface area that is less than said first side area by at least a factor of three.

9. The floor assembly of claim 8, wherein said second load-bearing surface area is less than said first side area by at least a factor of six.

10. The floor assembly of claim 8, wherein said sleeper feet have a foot height that does not exceed said sleeper body thickness.

11. The floor assembly of claim 8, wherein said sleeper body has a longitudinally-extending central channel formed in said first sleeper load-bearing surface that reduces said first load-bearing surface area to less than said first side area, said central channel of some of said sleeper bodies being disposed directly under abutting edges of adjacent subfloor panels.

12. The floor assembly of claim 8, wherein said sleeper feet extend parallel to each other for substantially the entirety of said sleeper body length.

13. The floor assembly of claim 12, wherein said sleeper body second side further comprises a second pair of sleeper feet extending therefrom, said second pair of sleeper feet extending parallel to each other for substantially the entirety of said sleeper body width.

14. The floor assembly of claim 8, wherein said sleeper body length is approximately 30 times larger than said sleeper body width.

15. The floor assembly of claim 8, wherein said support structure comprises a concrete slab.

16. The floor assembly of claim 8, wherein said support structure comprises a set of wooden joists arranged in parallel rows.

17. A floor assembly installation method, comprising:
installing a support structure;
placing a set of acoustic sleepers directly on said support structure so as to be in contact therewith;
installing a set of subfloor panels directly on said acoustic sleepers so as to be in contact therewith;
installing a floor on said subfloor panels; and
each of said acoustic sleepers comprising:
a solid sleeper body formed entirely from an elastomeric acoustic isolating material;
said sleeper body having a sleeper body thickness (T), a sleeper body width (T) substantially larger than said sleeper body thickness, a sleeper body length (L), and a generally rectangular cross-section having a cross-section width equal to W and a cross-section height equal to T;
said sleeper body having a first side and a second side;
said sleeper body first side having a first side area (A) equal to W×L, said sleeper body first side including a first sleeper load-bearing surface for contacting a first floor assembly structure, said first sleeper load-bearing surface having a first load-bearing surface area that is equal to or less than said first side area;
said sleeper body second side comprising a pair of solid sleeper feet extending therefrom, said sleeper feet being parallel to each other and arranged such that said sleeper body and said sleeper feet define an overall sleeper cross-section that is generally pi-shaped,
said sleeper feet extending continuously or non-continuously longitudinally along said sleeper body length, said sleeper feet collectively providing a second sleeper load-bearing surface for contacting a second floor assembly structure, said sleeper feet being the only longitudinally-extending components on said sleeper body second side supporting said sleeper body on said support structure; said sleeper body second side having a longitudinally-extending central channel formed between said sleeper feet; and
said second sleeper load-bearing surface having a second load-bearing surface area that is less than said first side area by at least a factor of three.

18. The floor assembly installation method of claim 17, wherein said acoustic sleepers are placed on said support structure prior to said subfloor panels being installed on said acoustic sleepers.

19. The floor assembly installation method of claim 17, wherein said acoustic sleepers are attached to said subfloor panels prior to said acoustic sleepers being placed on said support structure.

20. The floor assembly installation method of claim 17, wherein said acoustic sleepers are placed on said support structure with either said first load-bearing surface or said second load-bearing surface in contact with said support structure.

* * * * *